United States Patent [19]
Fujii et al.

[11] Patent Number: 6,020,076
[45] Date of Patent: Feb. 1, 2000

[54] JOINED CERAMIC STRUCTURES AND A PROCESS FOR THE PRODUCTION THEREOF

[75] Inventors: Tomoyuki Fujii, Nagoya; Ryusuke Ushikoshi, Tajimi, both of Japan

[73] Assignee: NGK Insulators, Ltd., Japan

[21] Appl. No.: 08/590,026

[22] Filed: Feb. 2, 1996

[30] Foreign Application Priority Data

Feb. 9, 1995 [JP] Japan ................................. 7-021658
Jan. 19, 1996 [JP] Japan ................................. 8-024836

[51] Int. Cl.$^7$ ........................ B21D 39/00; B32B 15/10; B32B 15/00
[52] U.S. Cl. .................... 428/621; 428/627; 428/628; 428/651; 428/652; 428/654; 428/663; 428/665; 428/680; 228/903
[58] Field of Search ................... 156/89, 155, 306.6, 156/309.6; 428/621, 627, 628, 632, 687, 680, 665, 663, 654, 652, 651; 228/56.3, 122.1, 124.5, 903

[56] References Cited

U.S. PATENT DOCUMENTS

| 4,530,884 | 7/1985 | Erickson et al. ................... 428/608 |
| 4,596,354 | 6/1986 | Moorhead ......................... 228/122 |
| 4,639,388 | 1/1987 | Ainsworth et al. ................. 428/117 |
| 4,979,977 | 12/1990 | Frank et al. ...................... 65/107 |
| 4,983,213 | 1/1991 | Mizuhara ........................... 75/252 |
| 4,987,035 | 1/1991 | Miller et al. ...................... 428/599 |
| 5,643,539 | 7/1997 | Collard et al. .................... 422/178 |

FOREIGN PATENT DOCUMENTS

| 0361678 | 4/1990 | European Pat. Off. . |
| 0375589 | 6/1990 | European Pat. Off. . |
| 6-99199 | 12/1994 | Japan . |
| 7-247176 | 9/1995 | Japan . |
| 94/25178 | 11/1994 | WIPO . |

Primary Examiner—Paul Thibodeau
Assistant Examiner—Holly C. Rickman
Attorney, Agent, or Firm—Parkhurst & Wendel, L.L.P.

[57] ABSTRACT

A joined ceramic structure including a ceramic member and a metallic joining member joined to each other through a joining layer made of a brazing material wherein a metallic member is buried in the ceramic member in the state that a metal-exposed portion is formed through partial exposure of the metallic member from such a joining surface of the ceramic member as contacting said joining layer, and the ceramic member and the metal-exposed portion are also joined to the joining layer along the joining surface of the ceramic member.

3 Claims, 12 Drawing Sheets

FIG_1

FIG_4
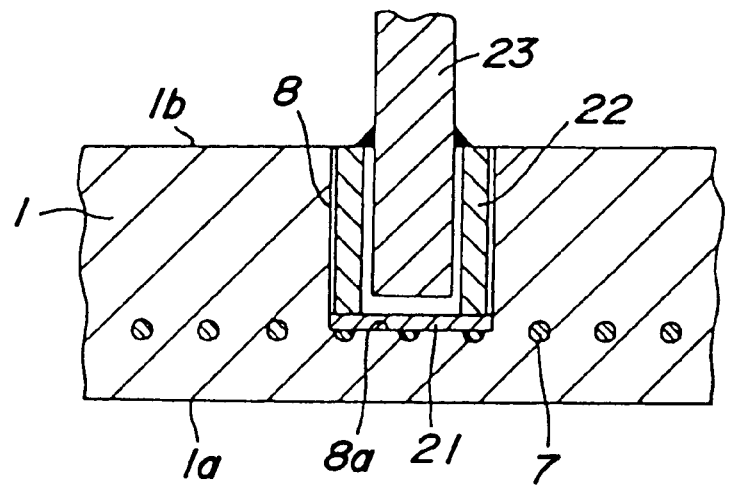
FIG_5
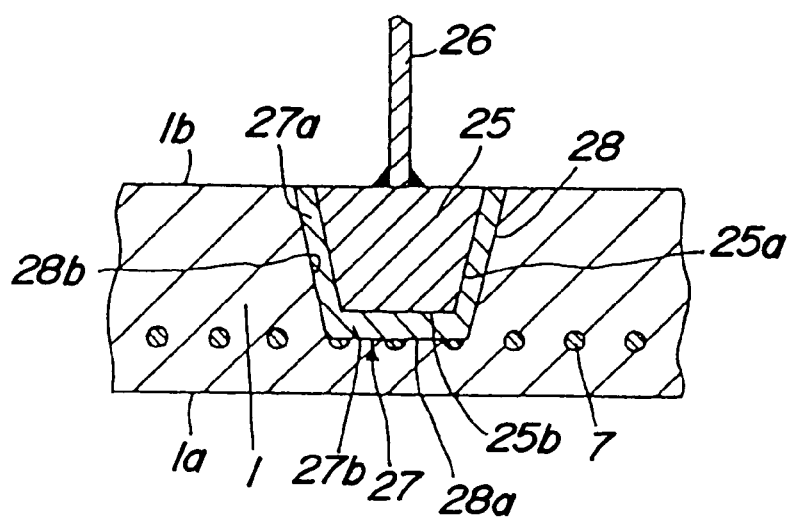

FIG_6
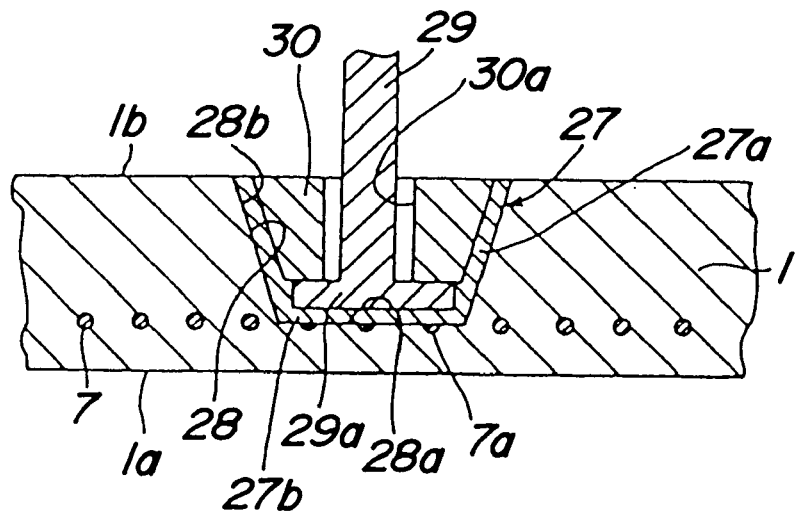
FIG_7
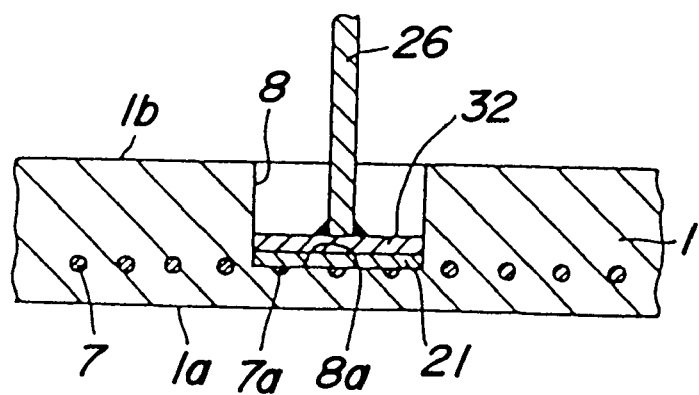

FIG_8
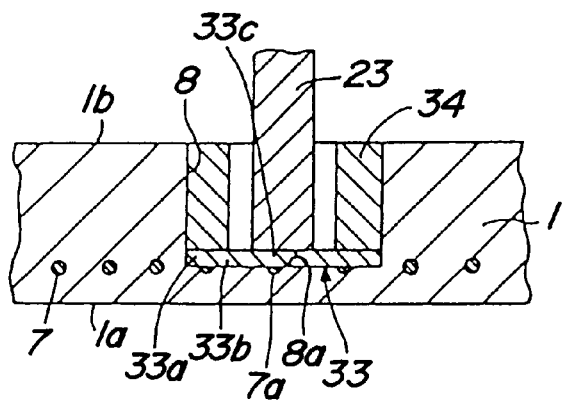
FIG_9
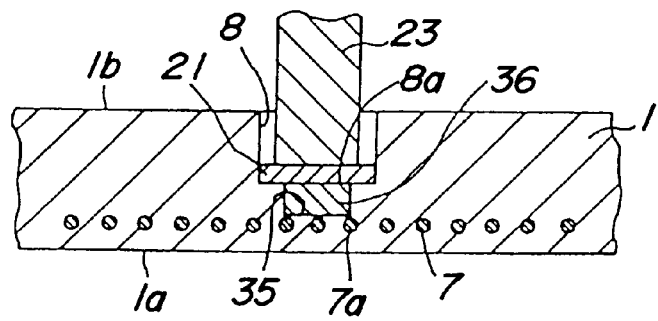
FIG_10
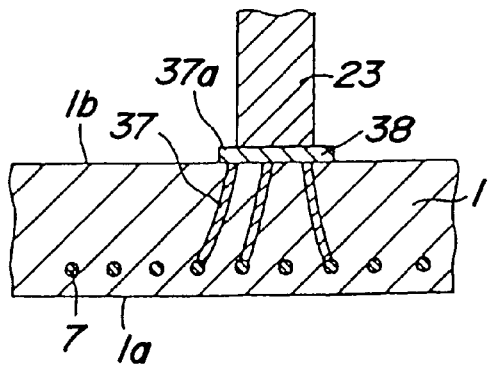

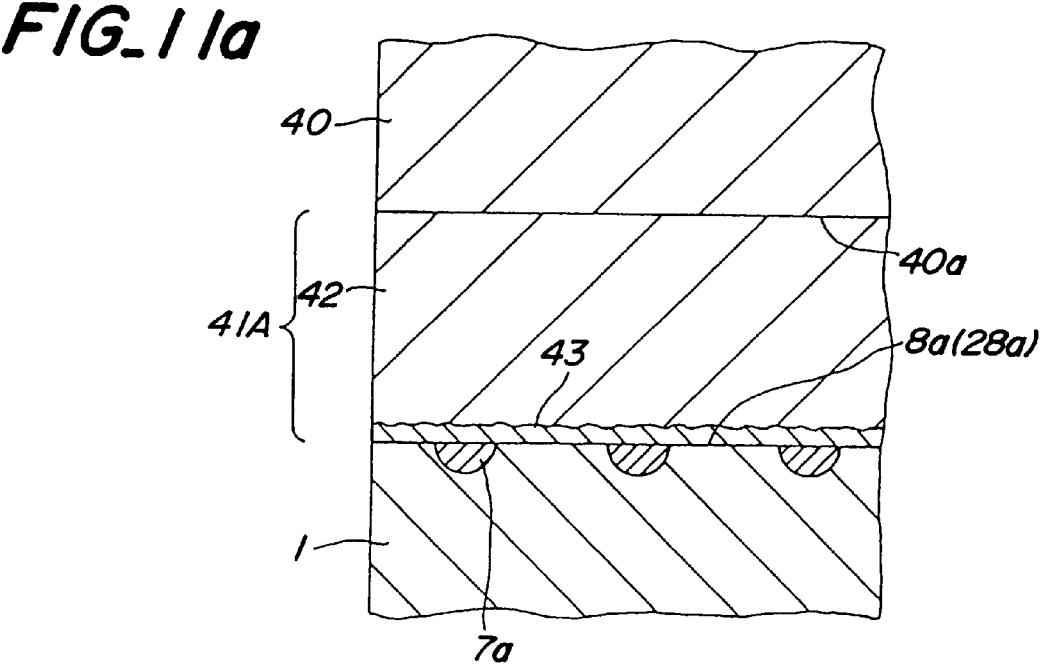
FIG_11a
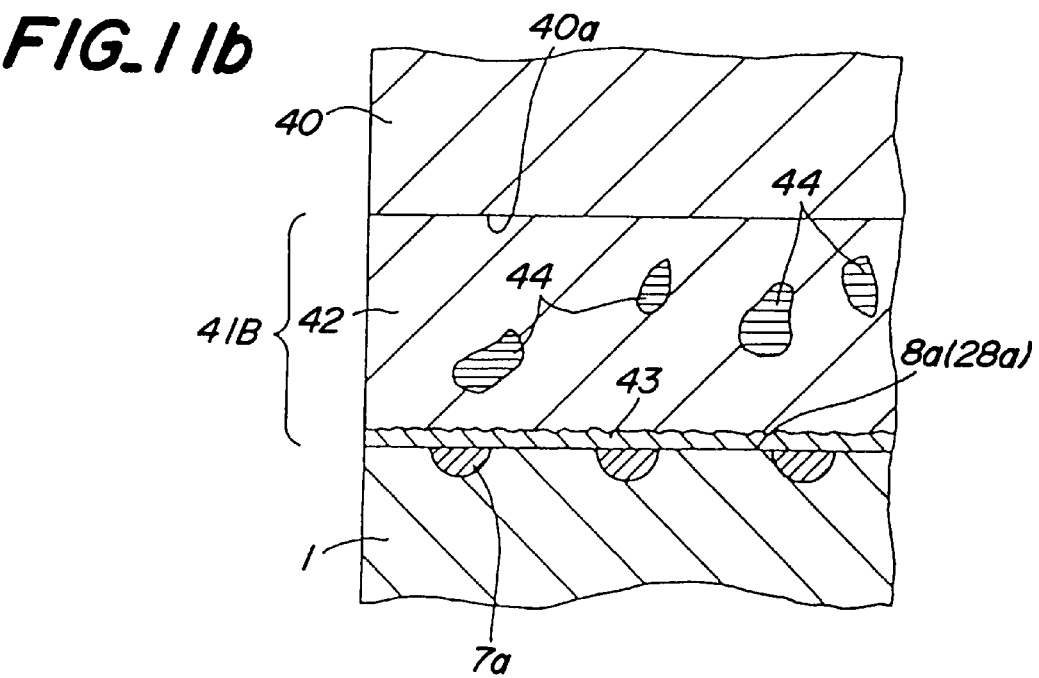
FIG_11b

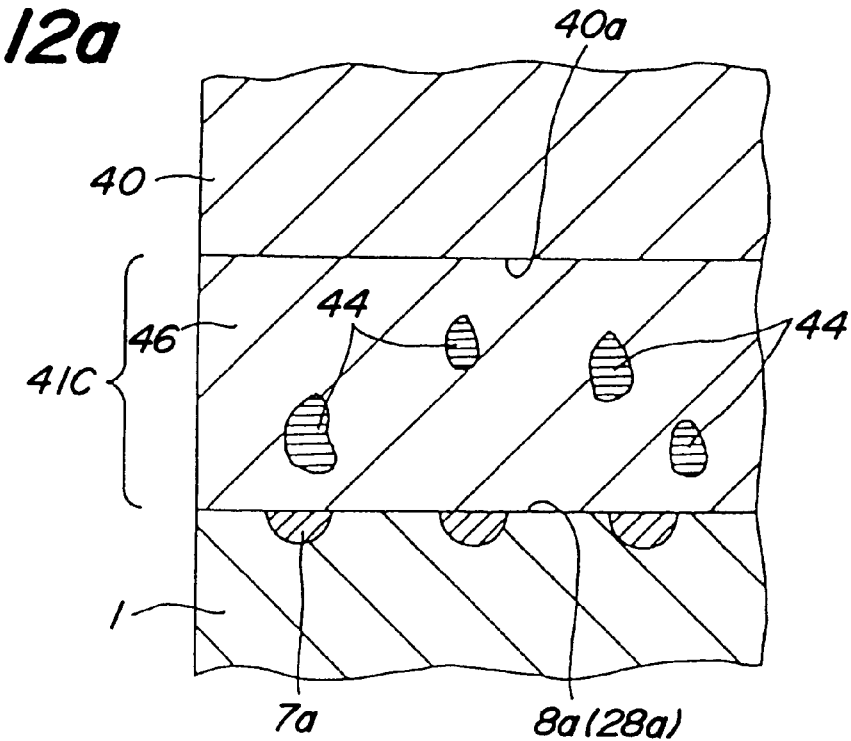
FIG_12a
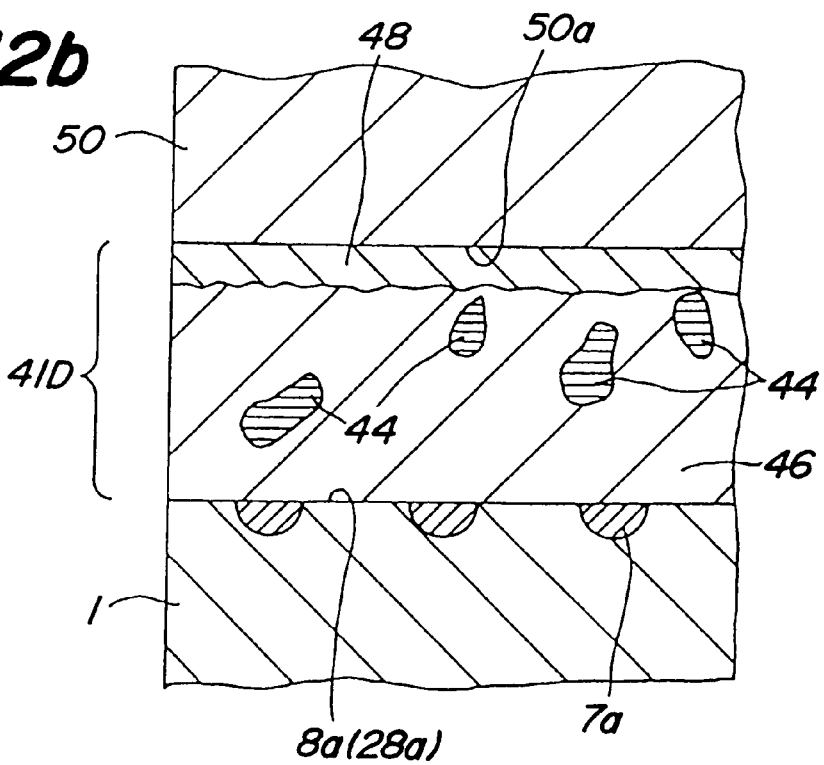
FIG_12b

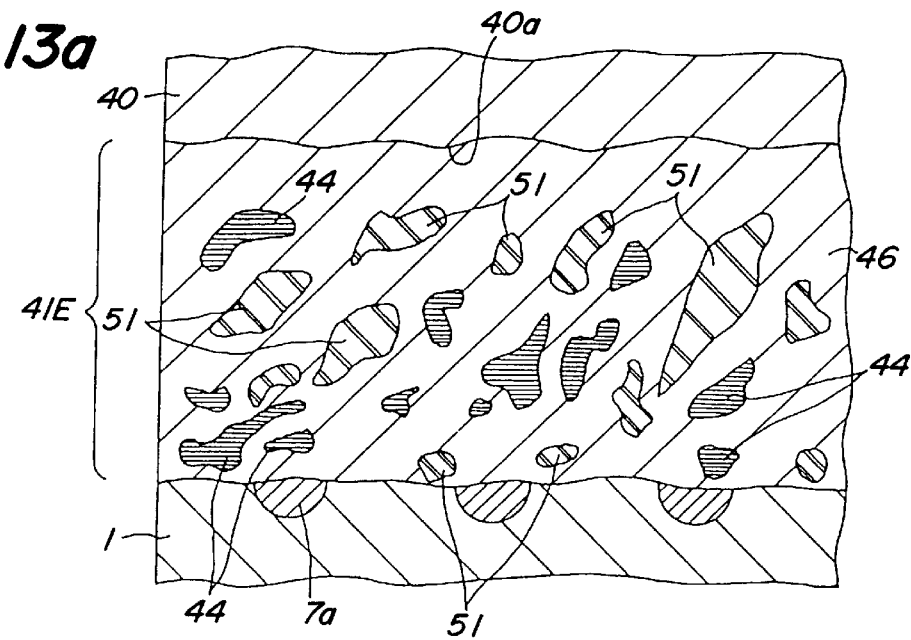
FIG_13a
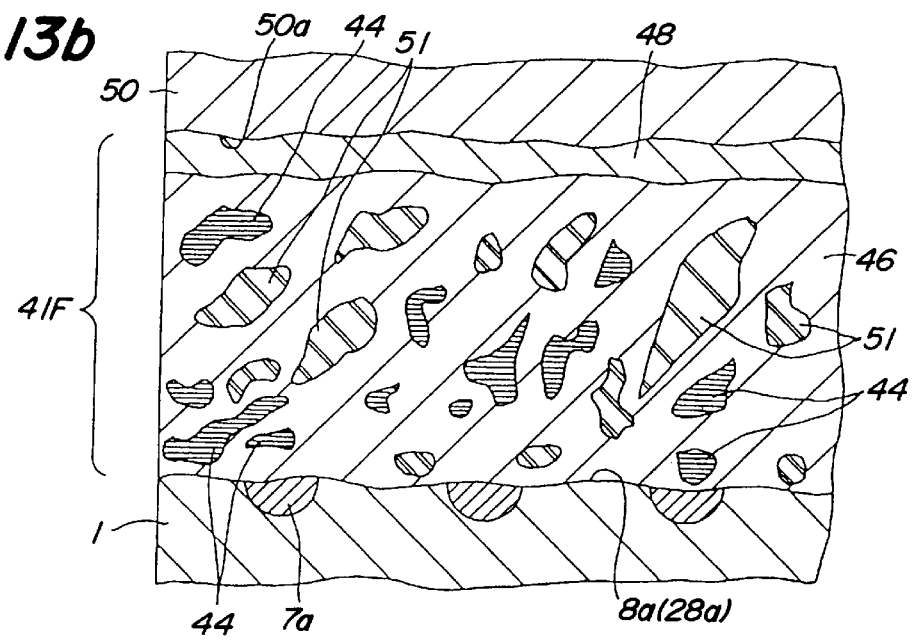
FIG_13b

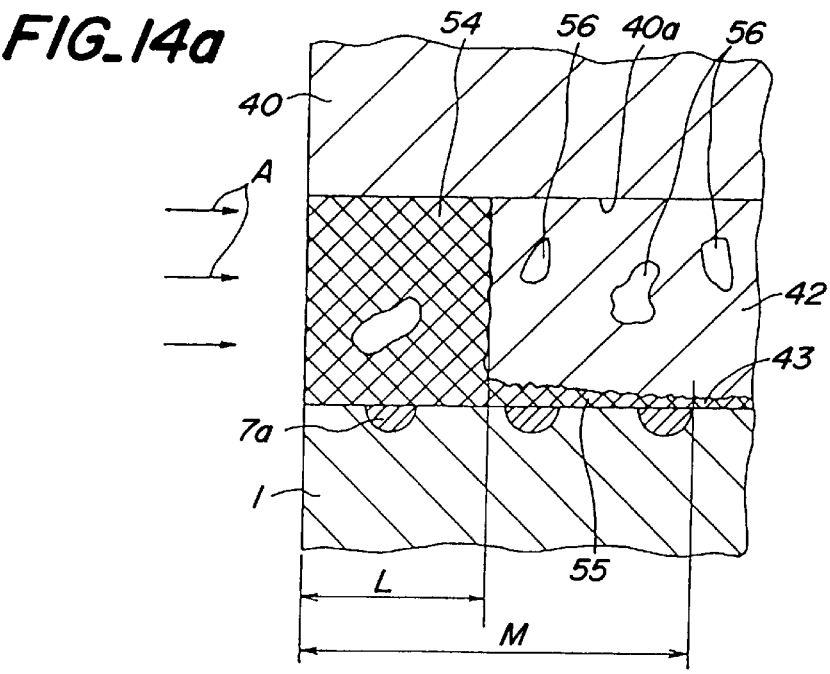
FIG_14a
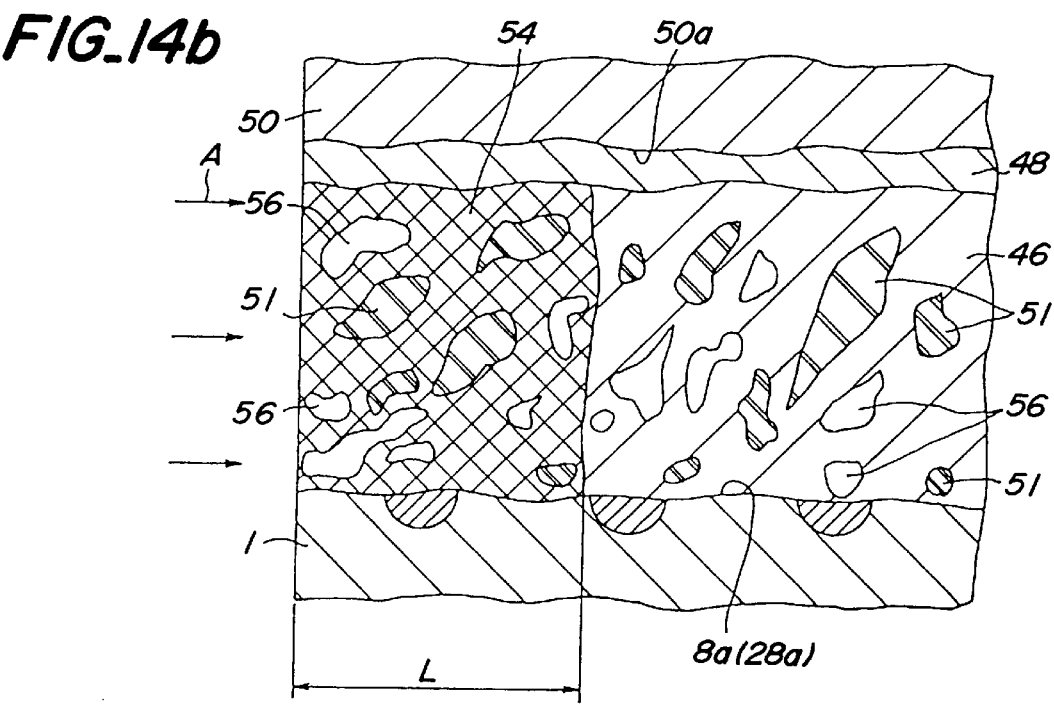
FIG_14b

FIG_15a
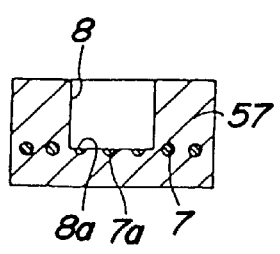
FIG_15b
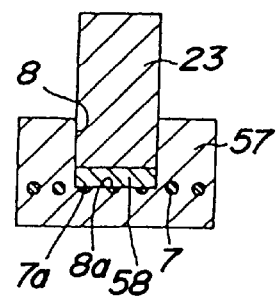
FIG_15c
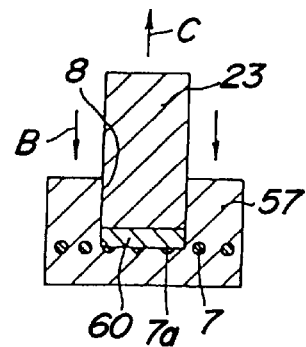

FIG_17
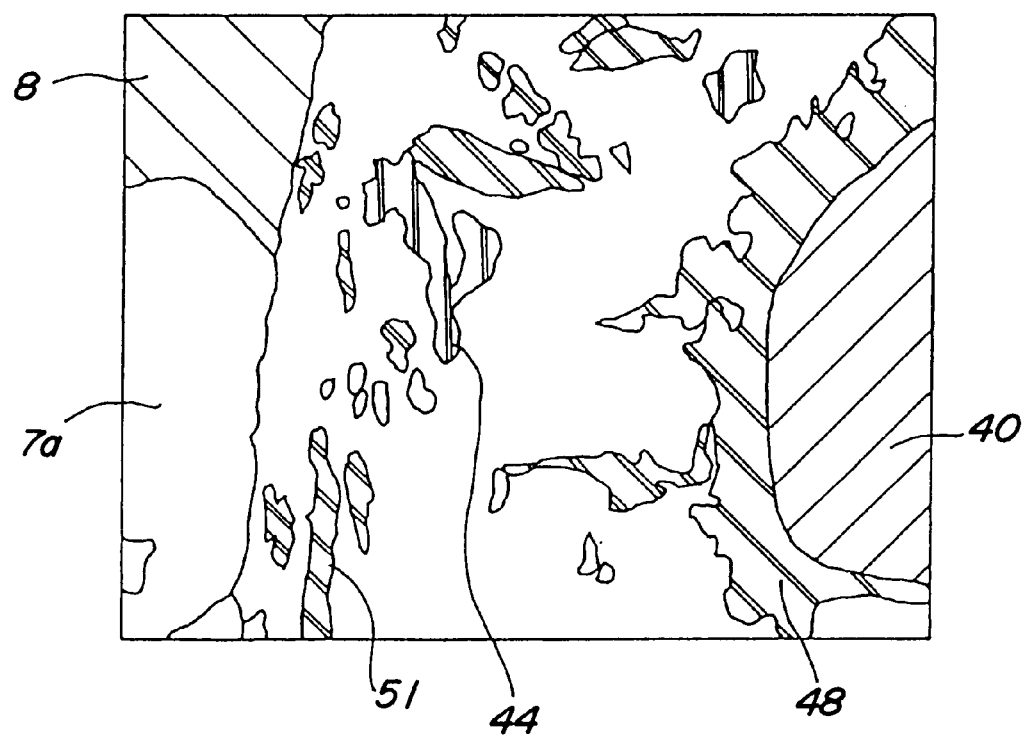

JOINED CERAMIC STRUCTURES AND A PROCESS FOR THE PRODUCTION THEREOF

BACKGROUND OF THE INVENTION (1) Field of the Invention

The present invention relates to joined ceramic structures in which a ceramic member is joined to a metallic joining member through a braxing material, and a process for the production thereof.

(2) Related Art Statement

Heretofore, joined articles made of aluminum nitride members and ceramic members as well as joined articles made of aluminum nitride members and metallic members have been constructed in various manners, and used in various applications. For example, in case of ceramic heaters, electrostatic chucks, high frequency electrodes, etc. used in semiconductor-producing apparatuses, aluminum nitride members vs. various ceramic members, aluminum nitride members vs. metallic fittings for thermocouple sets, aluminum nitride members vs. electrodes, etc. need to be joined to each other.

There has been known a conventional joined ceramic structure in which a brazing material is interposed between a ceramic member and a metallic joining member, and the ceramic member and the metallic joining member are joined to each other by heating the brazing material. The present inventors have discovered during research for improving the joined ceramic structure using such a brasing material that joining strength of the ceramic member and the metallic joining member joined together by the conventional brazing is not sufficient in some cases.

SUMMARY OF THE INVENTION

It is an object of the present invention to solve the above-mentioned problems, and to provide a joined ceramic structure having satisfactory joining strength as well an a process for the production thereof.

The joined ceramic structure according to the present invention comprises a ceramic member and a metallic joining member joined to each other through a joining layer made of a brazing material, wherein a metallic member is buried in said ceramic member in the state that a metal-exposed portion is formed through partial exposure of said metallic member from such a joining surface of the ceramic member as contacting said joining layer, and said ceramic member and said metal-exposed portion are joined to said joining layer along said joining surface of the ceramic member.

The process of the present invention for producing the joined ceramic structure comprising a ceramic member and a metallio joining member joined to each other through a joining layer made of a brazing material, comprising the steps of (1) separately preparing a ceramic aember and a metallic joining member, a metallic member being buried in said ceramic member such that a part of said metallic member is exposed from a joining surface of said ceramic member to which said metallic joining member is to be joined through the joining layer, a metal-exposed portion being formed by said exposed part of the ceramic member; (2) interposing said brazing material between said ceramic member and said metallic joining member in the state that said brazing material substantially contacts said joining surface of the ceramic member, the metal-exposed portion of the metallic member and a joining surface of the metallic joining member to which the ceramic member is to be joined through the joining layers (3) joining the ceramic member and the metal-exposed portion of the metallic member to the metallic joining member through the joining layer by brazing under heating.

The present inventors have discovered that the ceramic member and the metallic joining member are joined to each other at satisfactory joining strength by the steps of burying the metallic member in the ceramic member such that a part of the metallic member is exposed from that joining surface of the ceramic member which is to contact the brazing material so as to form the metal-exposed portion partially, and joining the ceramic member and the metal-exposed portion of the metallic member exposed from the ceramic member to the brazing material. By so doing, even if the ceramic member used is difficult to be wetted with the brazing material, high joining strength can be realized. That is, since the ceramic member is joined to so the brazing material not only between the joining surface of the ceramic member and the brazing material but also between the brazing material and the metal-exposed portion having good joinability to the brazing material, the effective or substantial joining area can be increased to realize the joined ceramic structure having sufficient joined strength and enhanced load resistance. Further, as mentioned later, since the joined state between the ceramic member and the brazing member is satisfactorily formed free from substantial clearance, it is possible to obtain the joined ceramic structure exhibiting satisfactorily corrosion resistance at the metal-exposed portion of the metallic member and the joining surface of the metallic joining member even when used in a corrosive atmosphere such as a halogen gas.

The brazing material used in the present invention is not particularly limited to any specific chemical composition.

However, it is preferable to use the brazing material which exhibits satisfactory joining strength and wetting feasibility to the ceramic member itself. When such a joined ceramic structure is intended for use in exposure to the halogen-based corrosive gas, it is preferable to use dense alumina or aluminum nitride as the material for the ceramic member. In this case, it is preferable to use a brazing material composed of a metal selected as a main component from the group consisting of Cu, Ni and Al, 0.3 to 20% by weight of at least one active metal selected from the group consisting of Mg, Ti, Zr and Hf and not more than 50% by weight of a third component. When the joined ceramic structure is intended for use requiring corrosion resistance against the halogen-based corrosive gas, it is preferable to avoid use of an Ag-based brazing material because Ag has low corrosion resistance.

It is preferable to use at least one kind of Si, Al, Cu and In as the third component, because such will not afford adverse effect upon the main component. Further, it is particularly preferable to use the brazing material containing Al as the main component, because such a brazing material permits the joining at a low temperature and thus smaller thermal stress after the joining.

If the compounding amount of the active metal is less than 0.3% by weight relative to 100% by weight of the brazing material, its wetting power decreases, which may disable the joining. On the other hand, if the compounding amount is more than 20% by weight, a reacting layer formed at a joining interface becomes thick, which may cause cracking. Further, if the total compounding amount of the third component is more than 50% by weight, the amount of an intermetallic compound increases, which may cause the cracking at the joining interface. Thus, it is preferable to suppress the total compounding amount of the third component to not more than 50% by weight. As to the third component, such may not be contained in the brazing material.

Particularly, when the brazing material composed of a metal selected an the main component from the group consisting of copper, aluminum and nickel and 0.3% by weight to 20% by weight, with reference to the total weight of the brazing material, of at least one active metal selected from the group consisting of magnesium, titanium, zirconium and hafnium is used in the case of joining the aluminum nitride to the joining metallic member, the joining portion between the aluminum nitride member and the opponent member has remarkably improved corrosion resistance against the halogen-based corrosive gas and improved wetting power for the aluminum nitride member.

It was clarified that not less than 0.3% by weight of at least one active metal conspicuously enhances the wettability for the aluminum nitride member. If the amount of at least one active metal is increased to not less than 1.0% by weight, this wettability is further increased. On the other hand, not more-than 10% by weight of at least one active metal conspicuously enhances the corrosion resistance of the brazing material against the halogen-based corrosive gas. From the above point of view, it is preferable that the compounding amount of at least one active metal is not more than 5.0% by weight.

Since magnesium which is used as the active metal in the brazing material partially evaporates during the joining, the content of magnesium in the joining layer after the brazing may be less than 0.3 wt % even if magnesium is used at the compounding amount of not less than 0.3% by weight.

The content of aluminum, nickel or copper as the main component is a value obtained by subtracting the total content of the active metal and the third component from 100% by weight of the entire brazing material.

Since the above firm joining of the brazing material to the aluminum nitride member can not only increase the joining strength but also prevent the propagation of corrosion along the interface between the joining layer and the aluminum nitride member, the metallic joining member and the metal-exposed portion at the joining interface are more difficult to be corroded.

In the case of the aluminum alloy-based brazing material, it is preferable that 1 to 2% by weight of magnesium and 9 to 12% by weight of silicon are contained so as to enhance wetting power.

Further, it is preferable that a film made of at least one metal selected from copper, aluminum and nickel is formed, before the joining, on at least one a surface of said ceramic member to which the brazing material is joined and a surface of said brazing material which is to be joined to the aluminum nitride member by sputtering, vapor deposition, friction press contacting, plating or the like. This film enhances the wettability to the brazing material. Noreover, it is preferable that a film made of at least one metal selected from magnesium, titanium, zirconium and hafnium is formed, before the joining, on at least one of a surface of said first member made of aluminum nitride which is to be joined to said second member and a surface of said brazing material which is to be joined to the aluminum nitride member by sputtering, vapor deposition, friction press contacting, plating or the like. This film enhances the reaction between the brazing material. The thickness of each of the above metallic films is preferably in 0.5 to 5 μm.

As the halogen-based corrosive gas, $CF_4$, $NF_3$, $ClF_3$, HF, HCl and HBr may be recited by way of example. Among $CF_4$, $NF_3$, and $ClF_3$, $ClF_3$ has a particularly high F radical-dissociating degree, and the highest corrosion resistance when compared at the same temperature and plasma output. The thickness of the joining layer is preferably not less than 1 μm, and preferably not more than 500 μm.

When the joined ceramic structure according to the present invention is applied to a member to be exposed to the halogen-based corrosive gam, the joined ceramic structure is favorably applied to an article to be installed in a semiiconductor-producing apparatus using the halogen-based corrosive gas as a film-forming gas or an etching gas.

An such an article, mention may be made, for example, of positive type devices such as ceramic heaters in which a resistive heating element is buried in an aluminum nitride substrate, electrostatic ceramic chucks in which an electrostatically chucking electrode is buried in an aluminum nitride substrate, electrostatic chuck-provided heaters in which a resistive heating element and an electrostatically chucking electrode are buried in an aluminum nitride substrate, and a high freqnecy wave-generating electrode device in which a plasma generating electrode is buried in a aluminum nitride substrate.

In addition, mention may be made, for example, of devices such as dummy wafers, shadow rings, tubes for generating a high frequency plasma, a doom for generating a high frequency plasma, a high frequency wave-permeating windows, infrared beom-permeating windows, lift ping for supporting semiconductor wafers, showers, etc.

Preferred embodiments of the present invention are given below by way of example.

A. Joined Ceramic Structure (1) Ceramic material constituting said ceramic member is aluminum nitride.

(2) The joining layer comprises a continuous phase made of a metal selected from the group consisting of copper, aluminum and nickel as a main component and not more than 10% by weight of at least one active metal selected from the group consisting of magnesium, titanium, zirconium and hafnium.

(3) A metal constituting said metallic joining member is a metal selected from the group consisting of nickel, copper, aluminum and alloys made of any two or more of these metals.

(4) The main component of the continuous phase is aluminum, and magnesium is solid-solved in said continuous phase.

(5) Dispersion phases made of a nickel-aluminum intermetallic compound are formed in said continuous phase.

(6) The metallic member is made of a metal selected from the -group consisting of molybdenum, tungsten and an to alloy comprising molybdenum and tungsten.

(7) The metal-exposed portion has a network structure, and said ceramic member is partially exposed through meshes of the network structure.

B. Joined Ceramic Structure-Producing Process (1) the brazing material comprises not more than 50% by weight of a third component.

(2) The joined ceramic structure-producing process involves forming a film made of a metal selected from the group consisting of copper, aluminum, nickel, magnesium, titanium, zirconium and hafnium on at least one of the joining surface of said ceramic member and a surface of the brazing material on a side of the ceramic member.

BRIEF DESCRIPTION OF THE DRAWINGS

In the following, various embodiments to which the present invention is applied will be explained in reference to the drawings, in which:

FIGS. 4–10 are enlarged partial cross-sectional views illustrating several embodiments of joined ceramic structures along respective electrode-joining sections of an electrostatic chucking device similar to that which is shown in FIG. 1;

FIGS. 11(a) and 11(b) are enlarged sectional views schematically illustrating the joining layers formed according to the present invention. In FIG. 11(a) joining layer 41A, including continuous phase 42 and active metallic layer 43, is provided between metallic joining member 40 and aluminum nitride member 1. In FIG. 11(b), a joining layer 41B additionally including dispersed phases 44, is provided between metallic joining member 40 and aluminum nitride member 1;

FIGS. 12(a) and 12(b) are enlarged cross-sectional views schematically illustrating the joining layers formed according to the present invention. In FIG. 12(a) a joining layer 41C including a continuous phase 46 and dispersed phases 44, is provided between metallic joining member 40 and aluminum nitride member 1. In FIG. 12(b), a joining layer 41D additionally including a layer 48 is provided between a nickel member 50 and an aluminum nitride member 1;

FIGS. 13(a) and 13(b) are enlarged sectional views schematically illustrating joining layers formed according to the present invention. In FIG. 13(a) joining layer 41E including a continuous phase 46 and dispersed phases 44 and 51, is provided between aluminum nitride member 1 and metallic joining member 40. In FIG. 13(b) a joining layer 41F further including a layer 48, is provided between an aluminum nitride member 1 and a nickel member 50;

FIGS. 14(a) and 14(b) illustrate the effect of halogen-based corrosive gas brought into contact with joining layers according to the presently claimed invention;

FIGS. 15(a)–15(c) show steps illustrating the method of forming and testing a joined ceramic structure according to the present invention;

FIG. 17 is a schematic illustration of the microphotograph of FIG. 16.

FIG. 1 is a view illustrating an example of a structure of the electrostatic chuck device. In FIG. 1, a reference numeral 1 denotes an electrostatically chucking main body made of a ceramic member. In many cases, such an electrostatic chucking device having a high frequency wave electrode is used in the halogen-based corrosive gas atmosphere. Since aluminum nitride and dense alumina have corrosion resistance against such a corrosive atmosphere, the ceramic member is preferably made of aluminum nitride or dense alumina.

Figure 1:
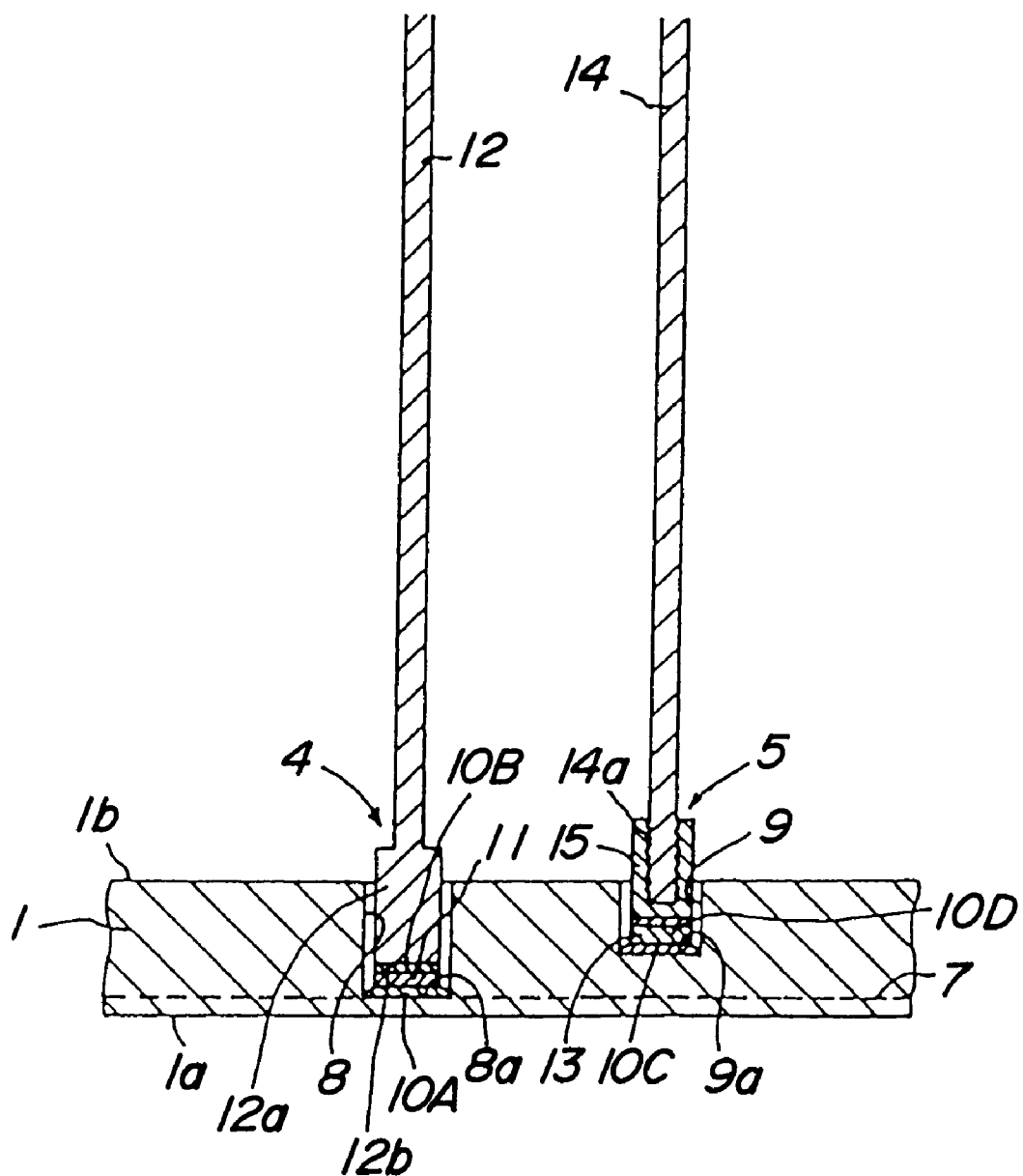
FIG. 1 is a cross-sectional view illustrating the structure of an electrostatic chuck device.

Reference numerals 4 and 5 denote an electrode-joining section and a thermocouple-joining section, respectively. The detailed structures of the electrode-joining section 4 and the thermocouple-joining section 5 are shown in FIG. 1.

As shown in FIG. 1, a mesh 7 is buried in the electrostatically chucking main body 1 near its surface 1a. This mesh 7 may be employed as a resistive heating element of an aluminum nitride heater or an electrostatically chucking electrode.

Further, in the electrostatically chucking main body 1 is formed a hole 8, which is opened to a rear surface 1b of the main body 1. A part of the mesh 7 is exposed from a bottom surface 8a of the hole 8. Thereby, metal-exposed portions 7a are formed as shown in an enlarged scale in FIG. 2. A terminal 12 is made of a corrosion resistant metal such as nickel, and has a cylindrical tip portion 12a having a diameter greater than the remaining portion of the terminal 12. A sheet 10A made of a brazing material preferably having a given composition specified above, a residual stress-mitigating insert material 11 and another sheet 15B made of the brazing material having the above specified composition are inserted between the tip end face 12a of the tip portion 12b and the bottom surface 8a of the hole 8. The electrode-joining section 4 is formed by brazing. FIG. 1 shows the electrostatic chuck in a non-joined state.

Figure 2:
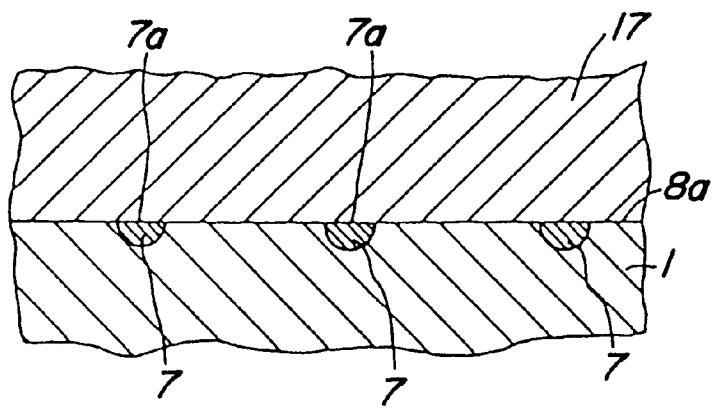
FIG. 2 is an enlarged partial cross-sectional view of an electrostatically chucking main body 1 having a mesh 7 buried therein.

What features the joined ceramic structure according to the present invention in connection with the electrostatically chucking device shown in FIG. 1 be lies in the above-mentioned electrode-joining section 4. That is, as shown in FIG. 2 by way of example, in the electrode-joining section 4, the bottom surface 8a of the hole 8 of the electrostatically chucking main body 1 made of aluminum nitride functions as a joining surface to which a joining layer 17 made of the brazing material directly contacts. The mesh 7 made of molybdenum, tungsten or an alloy thereof is partially exposed from the joining surface 8a, thereby forming the metal-exposed portions 7a. The joining layer 17 made of the brazing material is joined to the joining surface 8a of aluminum nitride and to the metal-exposed portions 7a of the mesh 7.

In particular, since a network structure is used as the above metal-expoeed portions in this joined ceramic structure, the joining layer 17 is alternatively joined to aluminum nitride and the metal-exposed portions an viewed at the joining interface so that more firm joining may be realized.

Further, the electrostatically chucking main body 1 contains a hole 9, which is opened to a rear surface 1b of the main body 1. The bottom surface 9a of the hole 9 is constituted by aluminum nitride. The hole 9 in shallower than the hole 8. Around a tip portion 14a of a thermocouple constituted by a pair of electrodes 14 is provided a cap 15 made of nickel for is the protection of the thermocouple. The outer diameter of the cap 15 is slightly sialler than the inner diameter of the hole 9, which enables the cap 15 to be easily inserted into the hole 9 at a given interval therebetween.

Between the tip end face of the cap 15 and the bottom portion 9a of the hole 9 are inserted a sheet 10C made of the brazing material having the above-specified composition, an insert material 13 and another sheet 10D of the brazing material having the above-specified composition. The thermocouple-joining section 5 is formed by brazing.

Figure 3A:
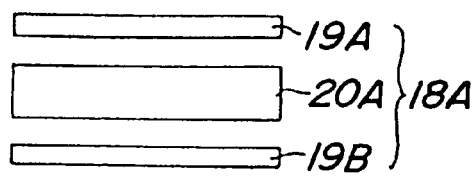
FIGS. 3(a) and 3(b) illustrate construction of brazing materials utilized to join ceramic structures according to the present invention.
Figure 3B:
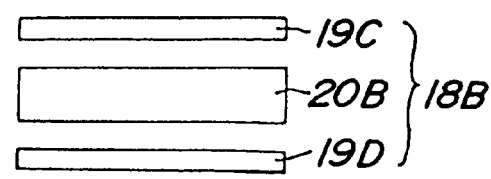

FIGS. 3(a) and 3(b) are views illustrating the construction of exemplified braiding materials to be used for the joined ceramic structures according to the present invention, respectively. In FIG. 3(a), the brazing material 18A is formed by sandwiching an insert material 20A made of aluminum with purity of 99.9% between sheets 19A and 19B made of an Al-based brazing material such as an Al-Mg brazing material. The thickness of each of the sheets 19A and 19B is, for example, 0.2 mm, whereas that of the insert material 20A is, for example, 0.55 mm.

In FIG. 3(b), the brazing material lies is formed by sandwiching an insert material 209 made of W or Mo between sheets 19C and 19D made of a Cu-based or Ni-based brazing material. The surface of the insert is preliminarily coated with Ni, Al or Cu before the inserting. The thickness of each of the sheets 19C and 19D is, for example, 0.2 mm, whereas that of the insert material 20B is, for example, 0.5 mm.

The joined ceramic structure according to the present invention may be produced by using only any one of the sheets 19A, 19B, 19C and 19D made of the respective brazing materials. However, when the insert material 20A or 20B is used as shown in FIG. 3(a) or 3(b), residual stress upon the ceramic member made of aluminum nitride or the like joined to the brazing material can be reduced, and heat cycle resistance in the joined portion can be improved. Therefore, use of such an insert material is particularly preferable.

FIGS. 4 through 9 are views illustrating constructions of other joined ceramic structures near electrode-joining sections, respectively, in electrostatic chucking devices similar to that shown in FIG. 1. In each of the embodiments in FIGS. 4 to 9, the same members as those shown in FIG. 1 are given with the same reference numerals, and their explanation is omitted.

In an embodiment shown in FIG. 4, a cylindrical member 22 made of Ni or Al is placed in a hole 8, and a bottom surface 8a of the hole 8 is brazed to an under surface of the cylindrical member 22 by a joining layer 21. Then, a terminal member 23 made of Ni or Al is inserted into an inner space of the cylindrical member 22, and the terminal member 23 is welded to the cylindrical member 22 as shown.

In the embodiment of FIG. 5, a wall of a hole 28 is worked in a frusto-conical shape. The hole 28 includes a flat bottom surface 28a and an inclined wall surface 28b. A terminal end portion 25 made of Ni or Al and having a shape similar to that of the hole 28 is inserted into 28, and an inclined outer surface 25a and a bottom surface 25b of the terminal tip portion 25 are brazed to the inclined wall surface 28b and the bottom surface 28a of the hole 28 by joining layers 27a and 27b, respectively. A U-shaped joining layer 27 is formed by the joining layers 27a and 27b. Thereafter, a terminal member 26 made of Ni or Al is welded to the terminal portion 25.

In the embodiment illustrated in FIG. 5, the joining area can be increased by brazing the frustoconical portion (inclined peripheral surface of the hole) to the terminal and portion 25, so that gastightness is afforded upon the joining layer 27a. Therefore, an extremely high gas-tight structure can be given to the bottom portion 28a. Further, when the terminal end portion 25 is inserted into the hole 28, is the terminal end portion 25 in pressed downwardly from the upper side so that the terminal end portion 25 presses not only the joining layer 27b but also the inclined peripheral joining layer 27a. Accordingly, the the peripheral side of the terminal end portion 25 is more assuredly brazed to the hole.

In the embodiment shown in FIG. 6, a hole 30a is provided in a central portion of an inclined peripheral terminal end portion 30 as shown in the embodiment of FIG. 5. A rod-shaped terminal member 29 with a tip portion 29a is inserted and fixed into the hole 30a of the terminal end portion 30. The tip portion 29a is pressed against and brazed to a bottom 28a of a hole 28 under application of a load, thereby forming a brazed layer 27.

In the embodiment shown in FIG. 7, a thin disc 32 made of Ni or Al and having an outer diameter almost equal to an inner diameter of a hole 8 is brazed to a bottom 8a of the hole through a joining layer 21. Thereafter, a terminal member 26 made of Ni or Al is joined to the disc 32, for example, by welding, thereby forming an electrode. In the embodiment of FIG. 7, thermal stress during the production and use can be mitigated by using the disc 32.

In the embodiment of FIG. 8, a cylindrical intermediate member 34 made of aluminum nitride is brazed to a bottom 8a of a hole 8. simultaneously with this, a terminal member 23 made of Ni or Al is inserted into an inner space of the intermediate member 34, and the terminal member 23 is brazed to the bottom 8a, thereby forming an electrode. In the embodiment of FIG. 8, thermal stress can be reduced by brazing not only the terminal member 23 but also the intermediate member 32 made of aluminum nitride to the bottom 8a. In FIG. 8, a portion 33a of a joining layer 33 joins the intermediate member 34 to the ceramic member 1 and the metal-exposed portion 7a, whereas a portion 33b of the joining layer 33 is exposed to the space inside the hole 8 and a portion 33c joins the metallic terminal member 23 to the ceramic member and the metal-exposed portion 7a.

In the embodiment shown in FIG. 9, a hole 35 is formed under a hole 8, and a metallic member 7 inside a ceramic member (electrostatic chucking main body) 1 is exposed to the hole 35 in the form of metal-exposed portions 7a. A metallic conductive member 36 is joined to the bottom surface of the hole 35 and the metal-exposed portions 7a there so that the metallic conductive member 36 may be electrically connected to the mesh 7. The metal-conductive member 36 may be a metallic plate, or a metallic bulk formed by powder metallurgy. A tip surface of a terminal member 23 is brazed to the metallic conductive member 36 and the bottom 8a of the hole 8. One of main surfaces of a joining layer 21 contacts the terminal member 23, and the other contacts the metallic conductive member 36 and the ceramic member 1.

In an embodiment shown in FIG. 10, a mesh 7 is used instead of the metallic conductive member 36. That is, a part of the mesh 7 is cut, and cut portions 37 are bent up to a rear face 1b of a ceramic member 1. The ceramic member 1 is fired as it is. By so doing, end faces 37a of the bent portions 37 are exposed to the rear surface 1a. In this state, an end surface of a terminal member 23 is brased to the rear surface 1b of the ceramic member 1 and the end faces 37a of the cut and bent portions 37 through a joining layer 38.

In the embodiments shown in FIGS. 9 and 10, it is unnecessary to form a hole at a location corresponding to a portion of the mesh 7 by a troublesome working. Thus, the electrode-joining portion can be more easily formed accordingly.

The present inventors produced various joined articles composed of aluminum nitride members according to the above-mentioned joining processes, examined their joined portions and the structures of the joining layers in detail, and observed the structures of the joined portions and the joining layers in detail.

FIGS. 11(a) and 11(b), FIGS. 12(a) and 12(b) and FIGS. 13(a) and 13(b) are schematically sectional views illustrating the joining layers formed according to the present invention in an enlarged scale. In FIG. 11(a) a joining layer 41A is formed between an aluminum nitride member 1 and a surface 40a of a metallic joining member 40. This joining layer 41A includes a continuous phase 42 composed mainly of a metal selected from copper, aluminum and nickel.

An active metallic layer 43 made of at least one active metal selected from the group consisting of titanium, zirconium and hafnium is formed on a surface of the joining layer 41A on a side of the aluminum nitride member 1. It is considered that since these active metals are difficult to be solid-solved in a main component of the brazing material but easily wet a joining surface 8a (28a) of the aluminum nitride member 1, such a layer-shaped active metal is formed. FIGS. 11(a) and 11(b), FIGS. 12(a) and 12(b) and FIGS. 13(a) and 13(b) illustrate joining the electrostatic chucking main body 1 and the metallic joining member 40 as mentioned above. This metallic joining member 40 may be any one of the above-mentioned terminal members. Further, with respect to other types of the aluminum nitride members and the metallic joining members, such joining layers as illustrated in FIGS. 11(a) and 11(b), FIGS. 12(a) and 12(b) and FIGS. 13(a) and 13(b) may be formed.

In the joining layer 41C of FIG. 11(b), the construction of the continuous phase 42 and the active metal layer 43 is the same as in the joining layer 41A of FIG. 11(a), but a number of dispersion phases 44 are formed in the continuous phase 42. These dispersion phases 44 are particles made of a third component in the brazing material.

In a joining layer 41C of FIG. 12(a), a number of dispersion phases 44 are formed in a continuous phase 46. The dispersion phases 44 are particles made of a third component in the brazing material. The continuous phase 46 is joined to a surface 40a of a metallic joining member 40, and also firmly joined to a joining surface 8a (28a) of the aluminum nitride member 1 and metal-exposed portions 7a. The present inventors discovered that when the main component and the second component of the brazing material are aluminum and magnesium, respectively, the continuous phase into which magnesium is solid-solved is formed. In this case, different from the microstructures of the joining layers in FIGS. 11(a) and 11(b), no active metal layer is formed on the surface of the joining layer on a side of the aluminum nitride member 1. As a result, the main component of the continuous phase 46 shown in FIG. 12(a) is aluminum, and magnesium is solid-solved in the continuous phase 46.

In the joining layer 41D in FIG. 12(b), a main component and a second component (active metal component) of the brazing material are aluminum and magnesium, respectively. A nickel member 50 is used as a metallic joining member. By so doing, the nickel member 50 is reacted with aluminum in the brazing material during brazing, so that a layer 48 composed of a nickel-aluminum intermetallic compound is formed along a surface 50a of the nickel member 50.

In a joining layer 419 in FIG. 13(a), numerous dispersion phases 44 made of particles of a third component in the brazing material and numerous dispersion phases 51 made of the nickel-aluminum intermetallic compound are dispersed together in a continuous phase 46. In order to produce such a microstructure, the main component and the active metal component of the brazing material are aluminum and magnesium and the third component is incorporated into the brazing material. A film of nickel is preliminarily formed-on a joining surface 8a (28a) of the aluminum nitride member 1, or alternatively such a nickel film is preliminarily formed on a sheet-shaped brazing material on a side of the aluminum nitride member 1.

Thereafter, brazing is effected so that the continuous phase 46 in which magnesium is solid-solved in aluminum is produced and that the dispersion phases 51 are formed in the continuous phase 46 through the formation of the nickel-aluminum intermetallic compound via the reaction between nickel in the thin nickel film and aluminum and then the dispersion of such a nickel-aluminum intermetallic compound.

When the same brazing material and the same producing process as mentioned above are employed and further when a nickel member 50 is used as a metallic joining member, a joining layer 41F having a microstructure shown in FIG. 13(b) is produced. A continuous phase 46 and dispersion phases 44 and 51 in the joining layer 41F are the same as those in the joining layer 41E in FIG. 13(a), respectively. Further, a layer 48 made of the nickel-aluminum intermetallic compound is formed along the surface 50a of the nickel member 50.

As mentioned above, in the joining layers having the respective microstructures illustrated above, it it particularly preferable that the main component of the continuous phase is aluminum, and magnesium is solid-solved in the continuous phase. The embodiments illustrated in FIGS. 12(a) and 12(b) and FIGS. 13(a) and 13(b) correspond to this. When titanium, zirconium or hafnium is used as an active metal, as shown in FIGS. 11(a) and 11(b), there is a tendency that such a metal collects on the side of the aluminum nitride member and forms an active metal layer, so that wettability of the aluminum nitride member with the brazing material is enhanced.

For example, as shown in FIG. 14(a), when the halogen-based corrosive gas is brought into contact with the joining layer as shown by arrows A, the joining layer is successively corroded from its surface side with the result that surfaces of the metallic particles inside the continuous phase 42 are corroded. A reference numeral 54 denotes the corroded area, "L" being a width of the corroded area 54 as viewed from the surface of the joining layer. At that time, since the third component such as $SiO_2$ is more likely to be corroded with the metal as the main component of the continuous phase, the dispersion phases made of the third component are converted to pores 56 such that the pores 56 are produced at even a location deeper than the corroded area 54.

In this case, the present inventors discovered to that the active metal layer 43 was also susceptible to the corrosion with the halogen-based corrosive gas, and an corroded area 55 was produced in a layer form along the layer 43 between the continuous phase 42 and the aluminum nitride member 1. The width M of the corroded area 55 was far greater than that L of the corroded area 54 of the continuous phase 42. However, such a slender layer-shaped corroded area 55 may conspicuously reduce joining strength between the members 1 and 40.

To the contrary, when the main component of the continuous phase is aluminum and magnesium is solid-solved in the continuous phase, no such a layer-shaped corroded area 55 is produced. Consequently, corrosion resistance against the halogen-based corrosive gas is further enhanced.

The present inventors further discovered that the nickel-aluminum intermetallic compound exhibits remarkable corrosion-resistance against the halogen-based corrosive gas. For example, when the halogen-based corrosive gas in brought into contact with the joining layer having the microstructure shown in FIG. 13(a) or 13(b) as shown by arrows A in FIG. 14(b), the continuous phase 46 in corroded and the dispersion phases made of the third component are corroded to form the pores 56. However, no corrosion of the layer 48 made of the nickel-aluminum intermetallic compound is observed, and corrosion of the dispersion phases 51 made of the nickel-aluminum intermetallic compound including the dispersion phases 51 in the corroded area 54 is not observed.

In this way, the nickel-aluminum intermetallic compound exhibits high corrosion resistance whether the compound exists in the form of the dispersion phases or in the form of the continuous phase in the joining layer. Particularly, a number of the dispersion phases 51 more advantageously exist in the continuous phase composed mainly of aluminum, because propagation of the corrosion progressing in the continuous phase is stopped with the dispersion phases 51 dispersed in the continuous phase and corrosion resistance of the continuous phase itself is improved.

The nickel-aluminum intermetallic compound includes $Al_3Ni$, $Al_2Ni$ and AlNi. The particle diameter of the dispersion phases made of the nickel-aluminum intermetallic compound ranges ordinarily from 2 to 500 $\mu$m, particularly preferably from 10 to 100 $\mu$m. The shape of the dispersion phases have unspecified shapes.

In the following, actual embodiments of the present invention will be explained.

EXPERIMENT 1

Joined articles made of aluminum nitride members and various metallic joining members were prepared by examples of the joined ceramic structure of the present invention, in which a Mo mesh was exposed to the surface of the aluminum nitride member. Tensile strength and the joined state were examined with respect to each of these joined ceramic members. First, aluminum nitride members, and various metallic joining members and brazing materials given in Table 1 were prepared. As shown in FIG. 15(a), a hole 8 was formed in the aluminum nitride member 57 in which the Mo mesh 7 was buried, so that the Mo mesh 7 was partially exposed in the form of metal-exposed portions 7a. The diameter of the metallic joining member 23 was slightly smaller than the inner diameter of the hole 8 so that the metallic joining member might be inserted into the hole 8.

Next, as shown in FIG. 15(b), a sheet-shaped brazing material 58 prepared above was arranged between a tip portion of the metallic joining member 23 and a bottom 8a of the hole 8 of the aluminum nitride member 57 to which the Mo mesh 7 was partially exposed, and the resulting assembly was heated at a temperature depending upon the composition of the brazing material. Thereby, joined ceramic articles in Example Nos. 1 to 13 as invention examples and those in Comparative Example Nos. 1 and 2 were obtained. In Example Nos. 5 and 6, a Ti film was preliminarily formed on a joining surface of the aluminum nitride member in a thickness of 3 $\mu$m or 1 $\mu$m, respectively, by sputtering before the joining. In Example No. 7, a Ti film was formed on a joining surface of the brazing material in a thickness of 1 $\mu$m by sputtering before the joining. In Example No. 8, an Al film was formed on a joining surface of the aluminum nitride member in a thickness of 1 $\mu$m by sputtering before the joining. With respect to Example Nos. 1 to 8 and 10 to 13 and Comparative Example Nos. 1 and 2, a load of 0.6 g/mm² was applied during the joining, whereas in Example No. 9, a load of 26.5 g/mm² was applied during the joining.

Lastly, each of the thus obtained joined ceramic articles was subjected to a tensile test illustrated in FIG. 15(c), thereby measuring tensile strength. That is, the metallic joining member 23 was pulled upwardly as indicated by an arrow C, whereas the ceramic member 57 was pressed down as shown by arrows B. A portion of the joined interface was cut out, and was observed. A reference numeral 60 denotes a joining layer. Results are shown in Table 1.

TABLE 1

| | Metal | Brazing material | Tensile strength (MPa) | Joined state |
|---|---|---|---|---|
| Example 1 | Ni | Ni—2.25Ti—3Si—2Al | 12.8 | Joined to both |
| Example 2 | | Cu—2.25Ti—3Si—2Al | 11.7 | AlN member |
| Example 3 | | Al—1.5Mg—10Si | 10.5 | and Mo mesh |
| Example 4 | | Ag—2.25Ti—35Cu | 15.7 | |
| Example 5 | | Al—1.5Mg—10Si | 15.8 | |
| Example 6 | | Al—1.5Mg—10Si | 13.7 | |
| Example 7 | | Al—1.5Mg—10Si | 18.5 | |
| Example 8 | | Al—1.5Mg—10Si | 19.7 | |
| Example 9 | | Al—1.5Mg—10Si | 55.5 | |
| Example 10 | Cu | Cu—2.25Ti—3Si—2Al | 14.0 | Joined to both AlN member and Mo mesh |
| Example 11 | Al | Al—1.5Mg—10Si | 9.5 | Joined to both AlN member and Mo mesh |
| Example 12 | Mo | Cu—2.25Ti—3Si—2Al | 24.6 | Joined to both AlN member and Mo mesh |
| Example 13 | W | Cu—2.25Ti—3Si—2Al | 23.7 | Joined to both AlN member and Mo mesh |
| Comparative Example 1 | Ni | Ag—28Cu | 1.3 | Not joined to AlN member |
| Comparative Example 2 | | Al—1.5Mg—10Si | 5.1 | AlN & Ni joined body (No Mo mesh) |

From the results in Table 1, it is seen that Example Nos. 1 to 12 among the joined ceramic structures of the present invention in which the brazing material 55 is joined to both the aluminum nitride member 52 and the Mo mesh 51 exhibited higher tensile strength as compared with Comparative Example No. 1 in which the brazing material 55 was joined to the Mo mesh 51 but not joined to the aluminum nitride member 52 and Comparative Example No. 2 with no use of the Mo Mesh. Further, it is seen that among Examples in which the Al-based brazing material was used, Example Nos. 5 to 8 in which a given film was provided at a joining interface exhibited higher tensile strength as compared with Example 3 with no such film. In addition, it is also seen that Example No. 9 in which a higher load was applied during the joining exhibited higher tensile strength as compared with Example No. 3 with application of a smaller load during the joining.

EXPERIMENT 2

A joined article was prepared in the same manner as in Experiment 1. More specifically, a hole 8 was formed in an aluminum nitride member 57 in which a Mo mesh 7 warn buried, so that the Mo mesh 7 was partially exposed in the form of metal-exposed portions 7a. The diameter of the metallic joining member 23 was slightly smaller than the inner diameter of the hole 8 so that the metallic joining member might be inserted into the hole 8. A sheet 58 having a composition of Al-1.5 Mg-10 Si was arranged between a tip portion of a nickel member and a bottom 8a of the hole 8 of the aluminum nitride member 57 to which the Mo mesh was exposed. A nickel-plated film having a thickness of 2 $\mu$m was preliminarily formed on a surface of this sheet on a side of the aluminum nitride member.

Figure 16:
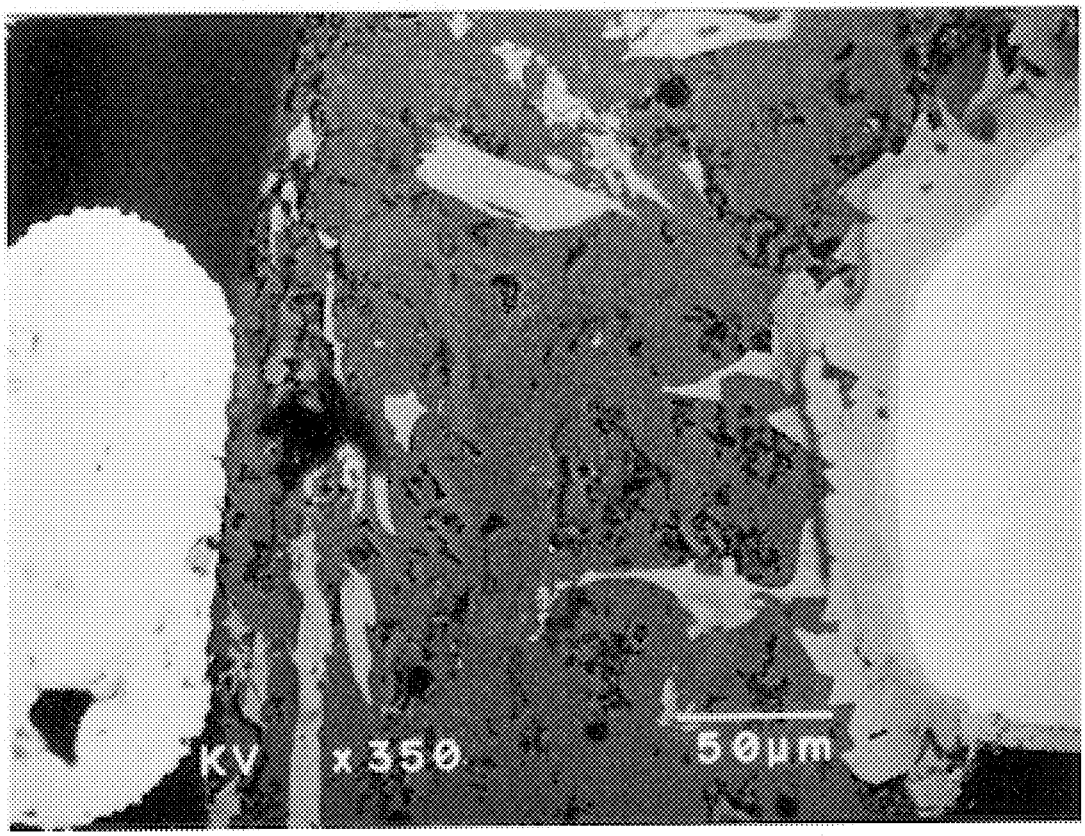
FIG. 16 is an electron microphotograph showing ceramic tissue along the joined interface of the joined ceramic structure of the present invention.

FIG. 16 is an electron microphotograph showing a ceramic tissue near the joined interface of the joined article thus obtained. FIG. 17 is a view for schematically illustrating the microphotograph in FIG. 16. As seen, a joining layer in positioned between the aluminum nitride member 8 and the nickel member 40, an aluminum-layer (a grey portion in the microphotograph) in which magnesium in solid-solved exists in the joining layer, and a number of dispersion phases 51 (whitish portions in the microphotograph) made of the nickel-aluminum intermetallic compound are formed in this aluminum layer. Further, it is recognized that a number of slender dispersion phases 44 (portions slightly brighter than the aluminum layer in the microphotograph) are produced. In addition, the production of a reaction layer 48 made of the nickel-aluminum intermetallic compound is recognized. The continuous phase made of the aluminum-based brazing material in which magnesium is solid-solved is joined to not only the aluminum nitride member 8 but also the metallic member (Mo mesh) 7a.

As is clear from the above explanation, according to the present invention, the joined ceramic structure is designed such that the metal-exposed portion is formed at a part of that surface of the ceramic member with which the brazing material is to contact, and the ceramic member, the metallic joining member and the metal-exposed portion are joined together through the brazing material. Thus, the ceramic member and the metallic joining member are joined together at a sufficient joining strength in a satisfactory corrosion-resistant state.

What is claimed is:

1. A joined ceramic structure comprising
an aluminum nitride ceramic member and
a first metallic member, said ceramic member and said first metallic member both being joined to a joining layer comprising a continuous phase of aluminum and magnesium having not more than 10% by weight of magnesium solid-solved in said continuous phase, wherein a second metallic member is buried in said ceramic member in a manner that a metal-exposed portion is created by partial exposure of said second metallic member from the surface of said ceramic member contacting said joining layer, said ceramic member having a structure in which said second metallic member is buried, and only a part of said second metallic member is exposed at that portion of the surface of said ceramic member contacting said joining layer.

2. A joined ceramic structure comprising
an aluminum nitride ceramic member and
a first metallic member, said ceramic member and said first metallic member both being joined to a joining layer comprising a continuous phase made of a metal selected from the group consisting of copper, aluminum and nickel as a main component and not more than 10% by weight of at least one active metal selected from the group consisting of magnesium, titanium, zirconium and hafnium, wherein dispersion phases made of a nickel-aluminum intermetallic compound are formed in said continuous phase, wherein a second metallic member is buried in said ceramic member in a manner that a metal-exposed portion is created by partial exposure of said second metallic member from the surface of said ceramic member contacting said joining layer, said ceramic member having a structure in which said second metallic member is buried, and only a part of said second metallic member is exposed at that portion of the surface of said ceramic member contacting said joining layer.

3. A joined ceramic structure comprising
an aluminum nitride ceramic member and
a first metallic member, said ceramic member and said first metallic member both being joined to a joining layer made of a brazing material, wherein a second metallic member made of a metal selected from the group consisting of molybdenum, tungsten and an alloy comprising molybdenum and tungsten is buried in said ceramic member in a manner that a metal-exposed portion is created by partial exposure of said second metallic member from the surface of said ceramic member contacting said joining layer, said ceramic member having a structure in which said second metallic member is buried, and only a part of said second metallic member is exposed at that portion of the surface of said ceramic member contacting said joining layer.

* * * * *